US012502904B2

(12) United States Patent
Van Keulen et al.

(10) Patent No.: US 12,502,904 B2
(45) Date of Patent: Dec. 23, 2025

(54) METHOD OF FORMING A VARNISH-COATED IMAGE

(71) Applicant: Canon Production Printing Holding B.V., Venlo (NL)

(72) Inventors: Luc Van Keulen, Venlo (NL); Jeroen A. Schell, Venlo (NL); Daniël H. Turkenburg, Venlo (NL); Guido G. Willems, Venlo (NL); Nicolaas T.A. Van Rens, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 239 days.

(21) Appl. No.: 18/202,045

(22) Filed: May 25, 2023

(65) Prior Publication Data

US 2023/0391124 A1 Dec. 7, 2023

(30) Foreign Application Priority Data

Jun. 2, 2022 (EP) .................................... 22176898

(51) Int. Cl.
*B41M 5/00* (2006.01)
*B41J 11/00* (2006.01)
*B41M 7/00* (2006.01)

(52) U.S. Cl.
CPC ........ *B41M 5/0017* (2013.01); *B41J 11/0015* (2013.01); *B41J 11/002* (2013.01); *B41M 7/00* (2013.01); *B41M 7/0018* (2013.01); *B41M 7/009* (2013.01)

(58) Field of Classification Search
CPC ... B41M 5/0017; B41M 7/0018; B41M 7/009
USPC .......................................................... 347/95
See application file for complete search history.

(56) References Cited

U.S. PATENT DOCUMENTS

| | | | | |
|---|---|---|---|---|
| 9,278,515 | B2 * | 3/2016 | Sarkisian | B41M 5/0017 |
| 2020/0216703 | A1 | 7/2020 | Fujii et al. | |
| 2021/0252895 | A1 | 8/2021 | Schmitt-Lewen et al. | |

FOREIGN PATENT DOCUMENTS

| | | | |
|---|---|---|---|
| EP | 2 774 765 | A1 | 9/2014 |
| EP | 3 415 334 | A1 | 12/2018 |
| WO | WO 2021/201873 | A1 | 10/2021 |

OTHER PUBLICATIONS

European Search Report, issued in Application No. 22176898, dated Nov. 22, 2022.

* cited by examiner

*Primary Examiner* — Stephen D Meier
*Assistant Examiner* — Thomas Ray Knief
(74) *Attorney, Agent, or Firm* — Birch, Stewart, Kolasch & Birch, LLP

(57) ABSTRACT

A printing method includes forming an image by applying marking material onto the surface of a substrate; optionally applying an intermediate layer onto the substrate; subjecting the image to a fixation treatment; applying a layer of an ionically stabilized varnish on the surface of the image; and performing image-wise gloss control by locally varying at least one of a fixation parameter and a primer application parameter.

9 Claims, 2 Drawing Sheets

METHOD OF FORMING A VARNISH-COATED IMAGE

BACKGROUND OF THE INVENTION

1. Field of the Invention

The invention relates to a printing method comprising the steps of:

- forming an image by applying marking material onto the surface of a substrate,
- optionally applying an intermediate layer onto the substrate or onto the formed image;
- subjecting the image to a fixation treatment; and
- applying a layer of an ionically stabilized varnish on the surface of the image.

2. Description of Background Art

WO 2021201873 A1 and US 2020216703 A1 disclose methods of this type, wherein the intermediate layer is a primer layer applied directly on the surface of the substrate. The main purpose of over-coating the printed image with a varnish layer is to improve the gloss of the image.

In order to further improve the gloss, US 2021252895 A1 proposes to provide a barrier layer between the image layer and the varnish layer.

EP 2 774765 A1 and EP 3 415 334 A1 disclose printing methods in which a fixation treatment comprises exposing the surface of the printed image to an atmosphere that contains hot water vapor.

SUMMARY OF THE INVENTION

It is an object of the invention to provide a printing method with improved control of the gloss of the image.

In order to achieve this object, the method according to the invention comprises a step of image-wise gloss control by locally varying at least one of a fixation parameter and a primer application parameter.

When an ionically stabilized varnish is used for obtaining a high gloss of the image, a degradation of the gloss of the image may be due to a migration of ions from the marking material and/or the primer into the varnish. For example, if the varnish is anionically stabilized, a high gloss is obtained because the anions in the varnish keep the varnish in a fluid state for a time period that is long enough for the varnish to form a smooth surface. Then, if the marking material includes cations, these cations may migrate into the varnish and may cause a premature destabilization of the varnish, so that the flow of the varnish is compromised before a smooth surface has been formed.

In the method according to the invention, the dependency of the glossiness of the image on the concentration of ions that are available for destabilizing the varnish is used for achieving an image-wise gloss control, so that, for example portions of an image that depict glossy surfaces can be rendered with a high gloss, whereas image areas that depict objects that have a surface texture that causes them to appear matt can be rendered with a predefined degree of mattness (spotmatte).

The local concentration of ions can be controlled by adjusting a fixation parameter such that a larger number of ions are absorbed into the interior of the substrate before the varnish is applied, or by reducing the amount or coverage of primer that is applied before the step of image formation. In the extreme, the amount of primer may be reduced to zero, so that no primer is applied at all. Conversely, the amount of glossiness can be reduced by adjusting a fixation parameter such that less ions are absorbed or by increasing the primer coverage or else by forming an intermediate primer layer after the image has been formed and before the varnish is applied. In the latter case, the primer in the intermediate layer will provide additional ions that help to destabilize the varnish.

More specific optional features of the invention are indicated in the dependent claims.

A fixation treatment to be applied after the step of image formation may be configured to temporarily create a layer of liquid solvent on the surface of the image. Then the solvent will cause ions that could destabilize the varnish to migrate from the marking material into the solvent. At least a part of the solvent with the ions dissolved therein will be absorbed into the substrate. In this way, the concentration of ions in the marking material can be reduced before the varnish is applied.

The varnish may be a water-based varnish, and the solvent film in which the ions from the marking material are to be dissolved may be a thin water film that is applied for example by means of a fixation treatment with super-heated steam (SHS).

In one embodiment, a pre-treatment liquid, e.g. a primer, may be applied to the surface of the substrate before the printing step in which the marking material is applied. The pre-treatment liquid may for example include $Mg^{++}$ cations or other divalent cations which help to destabilize the marking material that is applied for example in the form of a liquid ink. This has the advantage that the susceptibility of the ink to inter-color bleeding is reduced, so that the image quality can be improved. However, the use of a primer may have the undesired side-effect that cations that have migrated from the primer into the ink remain in the ink and may then migrate further into the varnish where they cause an undesired destabilization of the varnish. In the method according to the invention, however, this side-effect can be suppressed by absorbing the residual ions into the substrate before the varnish is applied. In this way, the choice of useable primers and the admissible contents of cations in the primer can be increased without compromising the gloss of the image.

The layer of varnish may be applied by means of an anilox roller. In that case, the absorption of at least a part of the ions into the substrate will also reduce the contamination of the anilox roller due to destabilized varnish.

In the method according to the invention, an image-wise gloss control may be achieved without image-wise control of the amount of varnish to be applied. This has the advantage that a uniform layer of varnish can be used for improving the robustness of the image. The invention also provides additional freedom of choice for complying with specific limitations as to the properties of the printed images such as limitations that have to be observed for food compliant materials (FCM), for example.

BRIEF DESCRIPTION OF THE DRAWINGS

Embodiment examples will now be described in conjunction with the drawings, wherein.

DETAILED DESCRIPTION OF THE INVENTION

Figure 1:
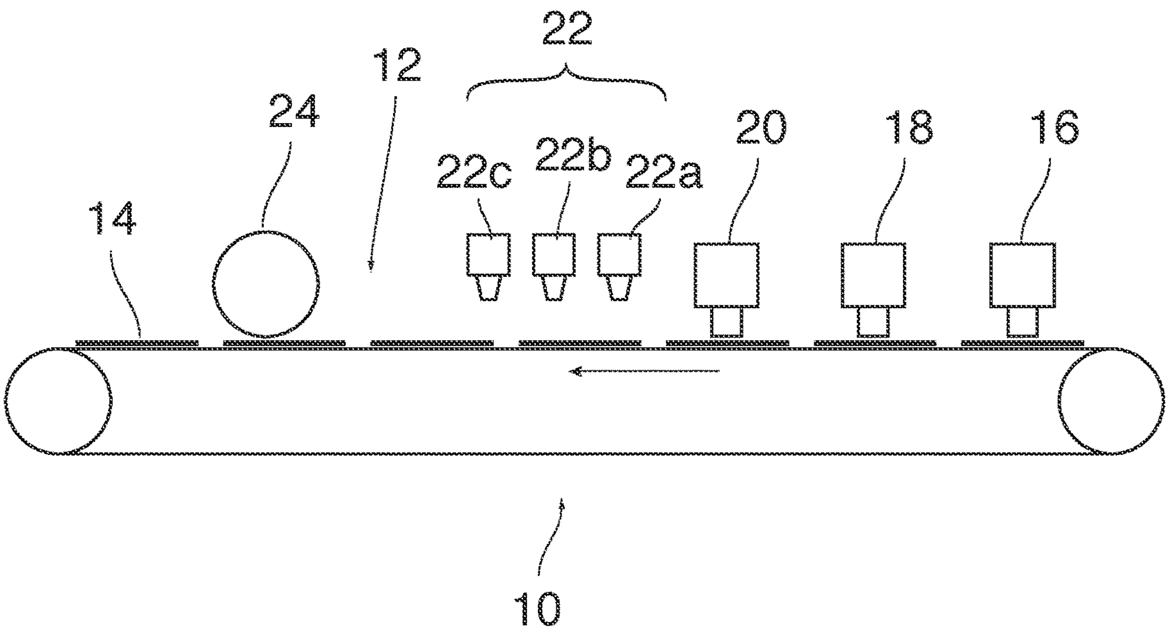
FIG. 1 is a schematic view of a printing system suitable for carrying out the invention.

The printing system shown in FIG. 1 comprises a conveyer 10 that constitutes a transport path 12 for sheet-like print substrates 14. A first primer application unit 16, an ink jet print engine 18, a second primer application unit 20, a fixation unit 22 and a varnish applicator 24 are disposed in that order in transport direction along the transport path 12.

The primer application units 16 and 20 are for example constituted by ink jet print heads and are configured for applying layers of a liquid primer image-wise onto the substrate 14. In this context, "image-wise" means that the amount of primer coverage may be different for different image areas. The primer may be any known and commercially available primer that is suitable as a pre-processing liquid for printing. Typically, the primer includes one or more salts that contain divalent cations such as $Mg^{++}$.

The print engine 18 comprises a multi-color inkjet print head assembly suitable for forming a printed image on the surface of the substrate 14 or rather on the surface of the first primer layer by jetting droplets of ink onto the substrate. The inks of different colors may for example be water-based inks each comprising a dispersion of color pigments. As long as the ink on the substrate is still in the liquid state, cations from the primer layer may dissolve into the ink and cause a desired destabilization of the ink, which reduces the fluidity or mobility of the ink and thereby suppresses a bleeding of ink of one color into a neighboring area of the image carrying ink of a different color.

The second primer application unit 20 may optionally be used for locally applying a layer of a transparent primer on the surface of the printed image so as to increase the concentration of cations if a particularly dull surface is desired for the respective part of the image.

The fixation unit 22 is configured to blow a stream of hot gases against the surface of the substrates 14 in order to cure the liquid ink and thereby to fix the printed images.

The hot gases may comprise hot air with a temperature of 120° at a pressure of 20.4 hPa and/or a super-heated steam (water vapor) having a temperature of 120°, a pressure of 0.4 hPa and an oxygen content of 13%. Optionally, the fixation unit may be configured to vary the ratio of hot air and steam that are jetted-out onto the substrates. The fixation unit may comprise an array of controllable nozzles 22*a*, 22*b*, 22*c* as shown in FIG. 1 by which the fixation conditions (composition and temperature of the hot gases) can be varied locally, so that different parts of the printed image are subjected to different fixation treatments.

When the stream of hot gases impinges on the surface of the substrate 14 which has a lower temperature than the stream of gas, the super-heated steam will condense on the surface of the substrate and will thus form a thin film of liquid water with a thickness of e.g. 4 μm on the surface of the printed image. Simultaneously, the substrate 14 will be heated to an elevated temperature.

While the heated substrates travel from the fixation unit 22 to the varnish applicator 24, the water contained in the liquid ink as well as the water that has been applied by the fixation unit 22 will evaporate, so that the ink is cured and the image is fixed on the substrate. As long as a film of water is still present on the surface of the substrate, cations from the primer liquid that have migrated into the ink may migrate further into the film of water. In other words, an excessive amount of salt that may be present in or on the ink layer will be dissolved into the water film.

It will be understood that, as the substrate moves towards the varnish applicator 24, only a part of the water in the film will evaporate while another part of the water will be absorbed into the substrate. The amount of water that is absorbed into the substrate will depend upon the absorptivity of the substrate material which will be high if the substrate is made of paper, for example. Due to this absorption process, a substantial portion of the cations that have been dissolved into the water film will be absorbed into the substrate so that the amount of cations remaining on the surface of the cured image will be reduced significantly.

In the example shown, the varnish applicator 24 comprises an anilox roller that is configured to apply a film of an anionically stabilized water-based varnish onto the surface of the cured image. Since the cations that have remained on the surface of the image tend to migrate into the varnish and to destabilize the varnish, the fluidity and mobility of the liquid varnish will be reduced to some extent, which diminishes the capability of the varnish to form a uniform surface layer before the varnish is set. As a consequence, the gloss of the image will be somewhat reduced due to the premature destabilization of the varnish. However, since the amount of cations present on the surface of the image has been reduced by absorbing most of the cations into the substrate, the degradation of the gloss of the printed image can be kept within predefined limits, even if the primer that has been applied by the applicator unit 16 had a high concentration of Mg salts in order to suppress inter-color bleeding and improve the quality of the printed color image. In this way, it is possible to obtain printed images which have both, a high image quality and a high gloss.

Figure 2:
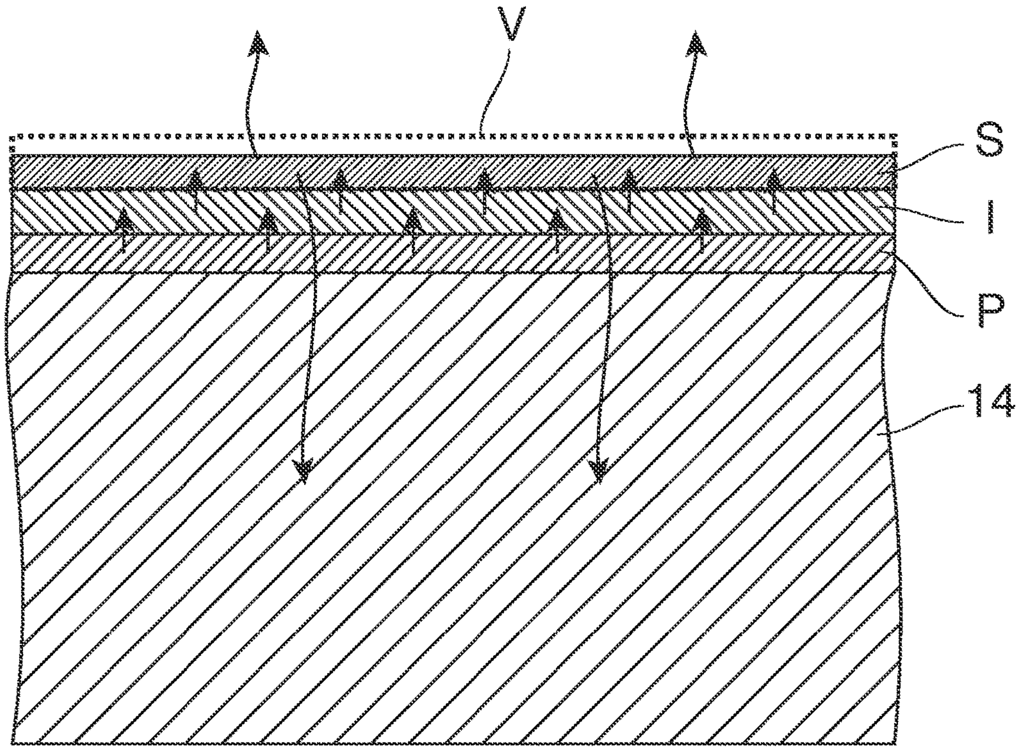
FIG. 2 is an enlarged sectional view of a portion of a substrate having a primer layer, an ink layer and a solvent layer on its surface.

FIG. 2 is a sectional view of a portion of one of the substrates 14 in the state in which it leaves the fixation unit 22. A layer of primer P and a layer of ink I have been formed by means of the first primer application unit 16 and the print engine 18, respectively, and the super-heated steam that has been applied in the fixation treatment has caused the temporary formation of a layer of solvent S (water) on the ink layer. Arrows symbolize the migration of cations from the primer P into the ink I and further into the solvent S. Part of the solvent with the ions dissolved therein will be absorbed into the substrate 14 and another part of the solvent will evaporate, as has been symbolized by "wavy" arrows. A layer of varnish V to be applied later has been indicated in dotted lines.

Figure 3:
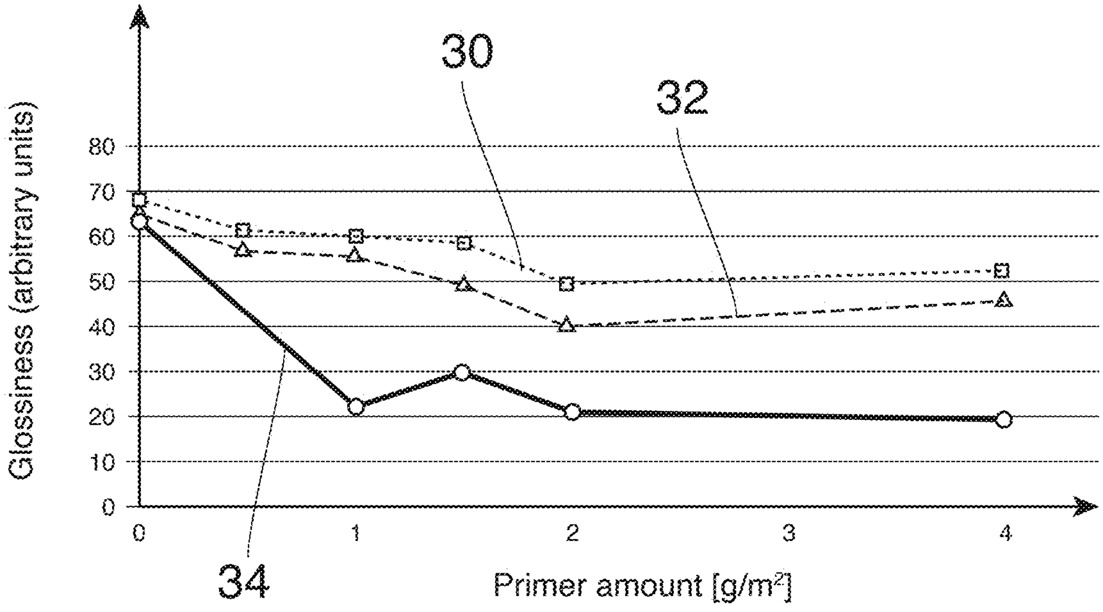
FIG. 3 is a diagram illustrating the effect of the invention on the gloss of the printed image for different settings of the print process.

FIG. 3 shows three curves 30, 32 and 34 which show the glossiness of the printed images as a function of the primer coverage (in the first primer layer applied directly on the surface of the substrate) for three different settings of the print process in which the ink coverage was 100% (curve 30), 20% (curve 32), and 0% (curve 34), respectively. No super-heated steam has been used in the fixation treatment in these examples. It can be seen that a reduction in gloss has been caused by the presence of $Mg^{++}$ ions in the primer and the ink, and the gloss reduction is more pronounced when the primer coverage is high. A high ink coverage tends to mitigate this effect, because more cations are consumed in the process of destabilizing the ink and are no longer available for destabilizing the varnish.

Figure 4:
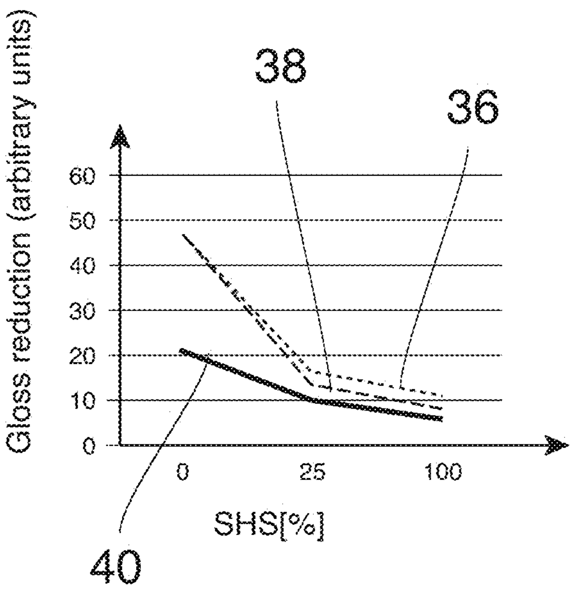
FIG. 4 shows graphs indicating the amount of gloss reduction of printed images as a function of settings of the fixation treatment for different amounts of primer coverage.

FIG. 4 shows three curves 36, 38 and 40 which show the reduction in glossiness as a function of a fixation treatment parameter that specifies the percentage of super-heated steam (SHS) in the hot gases. The curve 36 relates to a case where the primer coverage was 3 $g/m^2$, and the curves 38 and 40 relate to cases where the primer coverage was 2 $g/m^2$, and 1 $g/m^2$, respectively.

These results show that the glossiness of an image area can be increased by controlling the first primer application unit 16 to provide a reduced primer coverage and/or by controlling the fixation unit 22 to increase the percentage of hot steam used in the fixation treatment. Of course, the primer coverage can only be reduced down to a certain limit below which the inter-color bleeding of the ink would become too large. However, by combining the two means for controlling the gloss, it is possible to obtain a glossiness that varies within a large range.

On the other hand, the second primer application unit 20 may be used in order to locally reduce the glossiness of the image. Although the measures of decreasing the primer coverage in the first primer layer and/or increasing the amount of hot steam in the fixation treatment on the one hand and the measure of forming a second prior layer on the surface of the printed image have opposite effects, it is possible to use these measures in combination in order to achieve certain special effects. On the other hand, if a particularly dull surface is desired for certain image areas, it is possible to combine the three measures of increasing the primer coverage in the first primer layer, reducing the amount of hot steam in the fixation treatment and applying a second primer layer.

Figure 5:
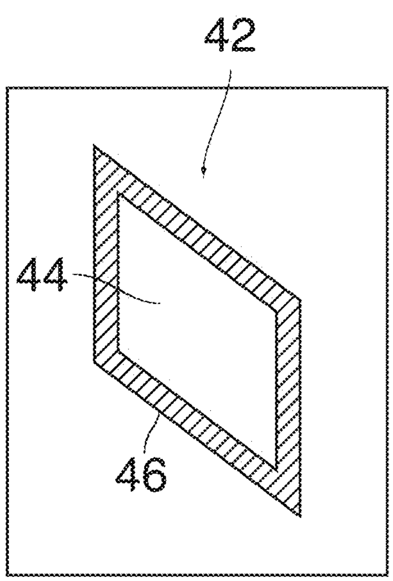
FIG. 5 shows an example of a printed image.

FIG. 5 shows a simple example of an image that has been printed using the method according to the invention. The image shown in FIG. 5 depicts a mirror 42 that has a reflective surface 44 and a wooden frame 46. By employing the measures discussed above, it is possible to obtain a high gloss in the area of the reflective surface 44 and a significantly lower gloss in the area of the frame 46. Thus, image-wise gloss control has been used for mimicking different surface textures of the objects shown in the printed image.

The invention claimed is:

1. A printing method comprising the steps of:

forming an image by applying marking material onto a surface of a substrate;

subjecting the formed image to a fixation treatment;

applying a layer of an ionically stabilized varnish on the surface of the formed image; and performing image-wise gloss control by locally varying at least one of:

primer application parameters by using an ink jet print head configured to apply layers of a liquid primer image-wise on the substrate via a first primer application unit constituted by an ink jet print head such that an amount of primer coverage is different for different image areas; and fixation parameters, wherein the fixation treatment comprises exposing the surface of the formed image to an atmosphere containing hot water vapor, and wherein varying fixation parameters includes locally varying the percentage of hot water vapor in the atmosphere via a fixation unit comprising an array of controllable nozzles, wherein said image-wise gloss control is performed to achieve desired gloss levels for different areas of the formed image by utilizing stored information correlating gloss levels with primer application parameters and with fixation parameters.

2. The method according to claim 1, wherein the primer application parameter specifies an amount of primer to be applied on the surface of the substrate before the formed image is formed.

3. The method according to claim 1, wherein the primer application parameter comprises a parameter specifying an amount of primer to be applied on the surface of the formed image before the layer of varnish is applied.

4. The method according to claim 3, wherein the fixation parameter specifies an amount of solvent to be applied on the surface of the formed image before the layer of varnish is applied.

5. The method according to claim 1, wherein the fixation parameter specifies an amount of solvent to be applied on the surface of the formed image before the layer of varnish is applied.

6. The method according to claim 5, wherein the varnish is a water-based varnish and wherein a fixation treatment comprises exposing the surface of the formed image to an atmosphere that contains hot gases including water vapor, and the fixation parameter specifies a ratio between water vapor and other gases in said atmosphere.

7. The method according to claim 2, wherein the primer application parameter comprises a parameter specifying an amount of primer to be applied on the surface of the formed image before the layer of varnish is applied.

8. The method according to claim 2, wherein the fixation parameter specifies an amount of solvent to be applied on the surface of the formed image before the layer of varnish is applied.

9. The method according to claim 1, further comprising the step of applying an intermediate layer onto the substrate or onto the formed image.

* * * * *